US008775947B2

(12) United States Patent
Martinez et al.

(10) Patent No.: US 8,775,947 B2
(45) Date of Patent: Jul. 8, 2014

(54) DATA SHARING SOFTWARE PROGRAM UTILIZING A DRAG-AND-DROP OPERATION AND SPRING-LOADED PORTAL

(75) Inventors: Anthony E. Martinez, Orcas, WA (US); Vanessa V. Michelini, Boca Raton, FL (US)

(73) Assignee: International Business Machines Corporation, Armonk, NY (US)

( * ) Notice: Subject to any disclaimer, the term of this patent is extended or adjusted under 35 U.S.C. 154(b) by 131 days.

(21) Appl. No.: 13/207,762

(22) Filed: Aug. 11, 2011

(65) Prior Publication Data

US 2013/0042183 A1 Feb. 14, 2013

(51) Int. Cl.
*G06F 3/00* (2006.01)

(52) U.S. Cl.
USPC .......................................... 715/748; 715/749

(58) Field of Classification Search
USPC ................................. 715/748, 749
See application file for complete search history.

(56) References Cited

U.S. PATENT DOCUMENTS

| | | | | |
|---|---|---|---|---|
| 6,133,898 A * | 10/2000 | Ludolph et al. | ................ | 715/790 |
| 7,587,467 B2 | 9/2009 | Hesselink et al. | | |
| 7,739,604 B1 * | 6/2010 | Lyons et al. | ................ | 715/736 |
| 7,783,985 B2 | 8/2010 | Indiran et al. | | |
| 2004/0250083 A1 * | 12/2004 | Schwab | ........................ | 713/182 |
| 2005/0190148 A1 * | 9/2005 | Fujita | ............................ | 345/156 |
| 2006/0088331 A1 * | 4/2006 | Inoue et al. | ....................... | 399/81 |
| 2008/0028321 A1 * | 1/2008 | Weksler et al. | ............... | 715/748 |
| 2008/0048975 A1 | 2/2008 | Leibow | | |
| 2008/0307352 A1 * | 12/2008 | Chaudhri et al. | .............. | 715/788 |
| 2010/0070900 A1 * | 3/2010 | Cummins et al. | ............. | 715/769 |
| 2010/0077347 A1 * | 3/2010 | Kirtane et al. | ................ | 715/803 |
| 2010/0218130 A1 * | 8/2010 | Conrad et al. | ................ | 715/769 |
| 2010/0281395 A1 * | 11/2010 | Apted | ........................... | 715/748 |
| 2011/0029604 A1 | 2/2011 | Bell et al. | | |
| 2012/0005737 A1 * | 1/2012 | Schwab | ........................... | 726/7 |

FOREIGN PATENT DOCUMENTS

WO   2010100075 A1   9/2010

OTHER PUBLICATIONS

Peter Tandler et al. "ConnecTables: Dynamic Coupling of Displays for the Flexible Creation of Shared Workspaces." Proceedings of the 14th annual ACM Symposium on User Interface Software and Technology (UIST '01), pp. 11-20. ACM Press, New York, NY, USA © 2001.
Wikipedia. "Synergy (software)." Web page last modified May 27, 2011, date printed Jun. 2, 2011 <http://en.wikipedia.org/wiki/Synergy_(software)>.

* cited by examiner

*Primary Examiner* — Kieu Vu
*Assistant Examiner* — Andrew Chung
(74) *Attorney, Agent, or Firm* — Isaac J. Gooshaw

(57) ABSTRACT

Embodiments include a program for transferring of data from a source computer to a location on a target computer utilizing a drag-and-drop operation and a spring-loaded portal. I/O devices are monitored for mouse input that includes coordinates of a mouse pointer. Whether an end-user is utilizing the mouse pointer to perform the drag-and-drop operation is determined. The spring-loaded portal is expanded from a closed position to an open position. A screen snapshot image of the location on the target computer is retrieved and overlaid on the spring-loaded portal. The transferring of data from the source computer to the location on the target computer is executed, wherein the location on the target computer is previewable at the source computer through the spring-loaded portal. Whether to abort the transferring of data is determined. The spring-loaded portal is minimized from the open position to the closed position.

24 Claims, 5 Drawing Sheets

DATA SHARING SOFTWARE PROGRAM UTILIZING A DRAG-AND-DROP OPERATION AND SPRING-LOADED PORTAL

TECHNICAL FIELD

The present invention relates generally to transferring data between computers, and more particularly to a data sharing software program for transferring of data from a source computer to a location on a target computer utilizing a drag-and-drop operation and a spring-loaded portal.

BACKGROUND

Technological improvements continue to be made in the area of data sharing software programs, which can reduce the need for face to face meetings. Specifically, software programs that enable data sharing can provide a way for end-users to collaborate through computers in order to achieve a desired task without the end-users having to be in the same physical location. For example, when multiple end-users are collaborating and sharing data to create a consolidated document (e.g., a text file, spreadsheet, or presentation), there often exists a challenge in regards to how to efficiently share the document between computers in a manner that enables a collaborative experience in editing the document.

Current technologies for data sharing between a source computer and a target computer include functionality for transferring of data through an e-mail attachment, a USB flash drive, a shared drive, an instant message, or a mouse-sharing software program. However, current software programs that enable the data sharing often require multiple steps, and do not provide an efficient and intuitive way to share data between computers.

Thus, the challenge of creating a data sharing software program for transferring of data from a source computer to a location on a target computer with minimal steps required by an end-user, and in a manner that is efficient and intuitive continues to persist.

SUMMARY

In one embodiment of the invention, a method is disclosed for transferring of data from a source computer to a location on a target computer utilizing a drag-and-drop operation and a spring-loaded portal. The method comprises the source computer monitoring I/O devices for mouse input, wherein the mouse input comprises coordinates of a mouse pointer. The method further comprises the source computer determining if an end-user is utilizing the mouse pointer to perform the drag-and-drop operation. The method further comprises the source computer expanding the spring-loaded portal from a closed position to an open position. The method further comprises the source computer retrieving a screen snapshot image of the location on the target computer and overlaying the screen snapshot image on the spring-loaded portal. The method further comprises the source computer executing the transferring of data from the source computer to the location on the target computer, wherein the location on the target computer is previewable at the source computer through the spring-loaded portal. The method further comprises the source computer determining whether to abort the transferring of data from the source computer to the location on the target computer. The method further comprises the source computer minimizing the spring-loaded portal from the open position to the closed position.

In another embodiment of the invention, a computer program product is disclosed for transferring of data from a source computer to a location on a target computer utilizing a drag-and-drop operation and a spring-loaded portal. The computer program product comprises a computer-readable tangible storage device and program instructions stored on the computer-readable tangible storage device. The program instructions comprise program instructions to monitor I/O devices for mouse input, wherein the mouse input comprises coordinates of a mouse pointer. The program instructions further comprise program instructions to determine if an end-user is utilizing the mouse pointer to perform the drag-and-drop operation. The program instructions further comprise program instructions to expand the spring-loaded portal from a closed position to an open position. The program instructions further comprise program instructions to retrieve a screen snapshot image of the location on the target computer and overlay the screen snapshot image on the spring-loaded portal. The program instructions further comprise program instructions to execute the transferring of data from the source computer to the location on the target computer, wherein the location on the target computer is previewable at the source computer through the spring-loaded portal. The program instructions further comprise program instructions to determine whether to abort the transferring of data from the source computer to the location on the target computer. The program instructions further comprise program instructions to minimize the spring-loaded portal from the open position to the closed position.

In another embodiment of the invention, a computer system is disclosed for transferring of data from a source computer to a location on a target computer utilizing a drag-and-drop operation and a spring-loaded portal. The computer system comprises one or more processors, one or more computer-readable memories, one or more computer-readable tangible storage devices, and program instructions stored on the one or more storage devices for execution by the one or more processors via the one or more memories. The program instructions comprise program instructions to monitor I/O devices for mouse input, wherein the mouse input comprises coordinates of a mouse pointer. The program instructions further comprise program instructions to determine if an end-user is utilizing the mouse pointer to perform the drag-and-drop operation. The program instructions further comprise program instructions to expand the spring-loaded portal from a closed position to an open position. The program instructions further comprise program instructions to retrieve a screen snapshot image of the location on the target computer and overlay the screen snapshot image on the spring-loaded portal. The program instructions further comprise program instructions to execute the transferring of data from the source computer to the location on the target computer, wherein the location on the target computer is previewable at the source computer through the spring-loaded portal. The program instructions further comprise program instructions to determine whether to abort the transferring of data from the source computer to the location on the target computer. The program instructions further comprise program instructions to minimize the spring-loaded portal from the open position to the closed position.

DETAILED DESCRIPTION

Exemplary embodiments now will be described more fully herein with reference to the accompanying drawings. This disclosure may, however, be embodied in many different forms and should not be construed as limited to the exemplary embodiments set forth herein. Rather, these exemplary embodiments are provided so that this disclosure will be thorough and complete and will fully convey the scope of this disclosure to those skilled in the art. In the description, details of well-known features and techniques may be omitted to avoid unnecessarily obscuring the presented embodiments.

The terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. It will be further understood that the terms "comprises" and/or "comprising", or "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof.

Figure 1:
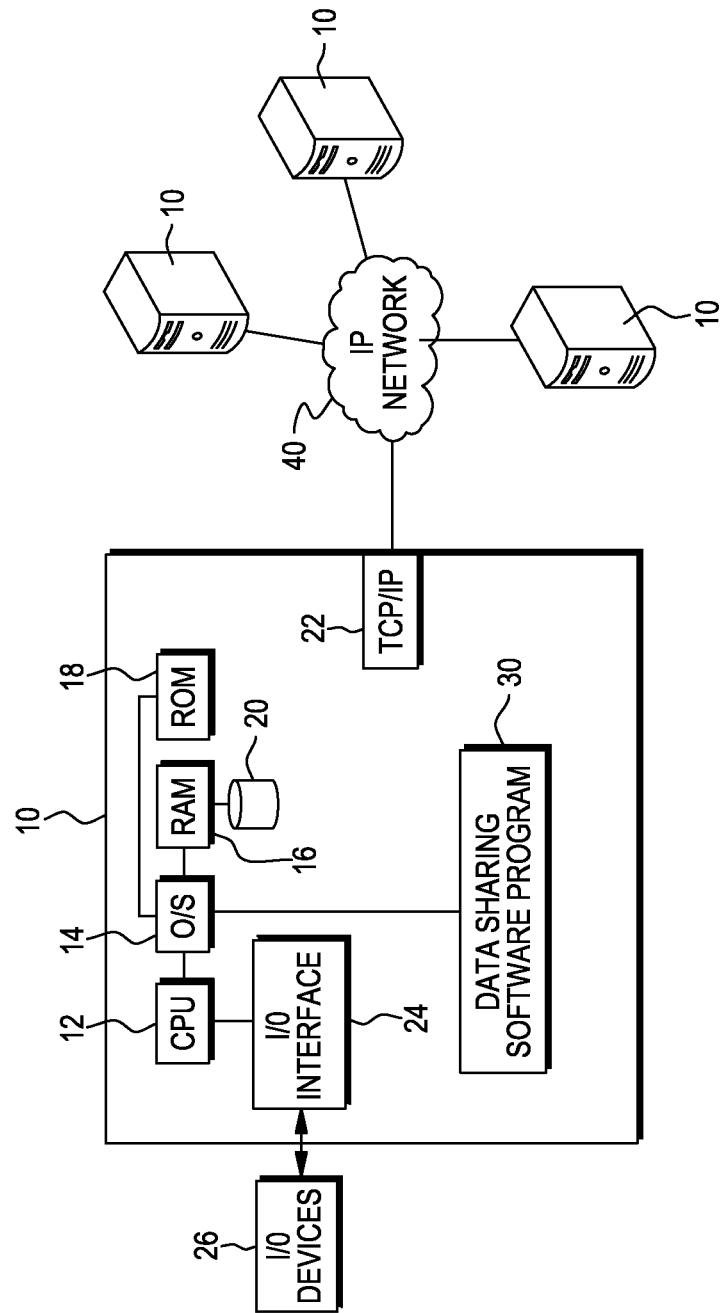
FIG. 1 is a block diagram of a computer system utilizing a data sharing software program according to an embodiment of the present invention.

FIG. 1 illustrates a computer system that includes computers 10 having data sharing software program 30 installed. Computers 10 are electronic devices that include desktops, laptops, and servers. Computers 10 each include CPU 12, operating system 14, RAM 16, ROM 18, storage 20 (which is a computer-readable hardware storage device, such as a hard drive) and TCP/IP adapter card 22. Computers 10 are each coupled to I/O devices 26 through an I/O interface 24. I/O interface 24 includes any system for exchanging information to or from an external device. I/O devices 26 include any known type of external device such as a display device (e.g., monitor), keyboard, mouse, printer, speakers, handheld device, facsimile, microphone, or webcam. The term "computer-readable hardware storage device" does not encompass signal propagation media such as copper cables, optical fibers and wireless transmission media.

Furthermore, computers 10 are connected to each other through TCP/IP adapter card 22 and IP network 40, wherein the computers each have program 30 installed, and wherein the program enables data to be transferred between the computers with minimal steps required by an end-user. Specifically, program 30 requires initial setup and configuration on each of computers 10 by the end-user. The initial setup and configuration of program 30 on each of computers 10 includes enabling the computers to send and/or receive requests for transferring of data through a drag-and-drop operation provided by the program, and creating a corresponding list of computers to transfer data to. Thus, each of computers 10 can be a source computer and/or a target computer for the transferring of data. After completion of the initial setup and configuration of program 30 on each of computers 10, a configurable spring-loaded portal 312 will appear along an edge of displays (e.g., monitor) that are coupled to the computers. More than one configurable spring-loaded portal 312 may appear along an edge of a display that is coupled to computers 10, and the amount of the configurable spring-loaded portals that appear depends on the number of computers that are on the corresponding list created during the initial setup and configuration of program 30. Moreover, configurable spring-loaded portal 312 can be sized in a vertical dimension, and assigned a label (e.g., color and/or text), based on preference of the end-user, to make the configurable spring-loaded portal easily identifiable by the end-user.

Figure 2A:
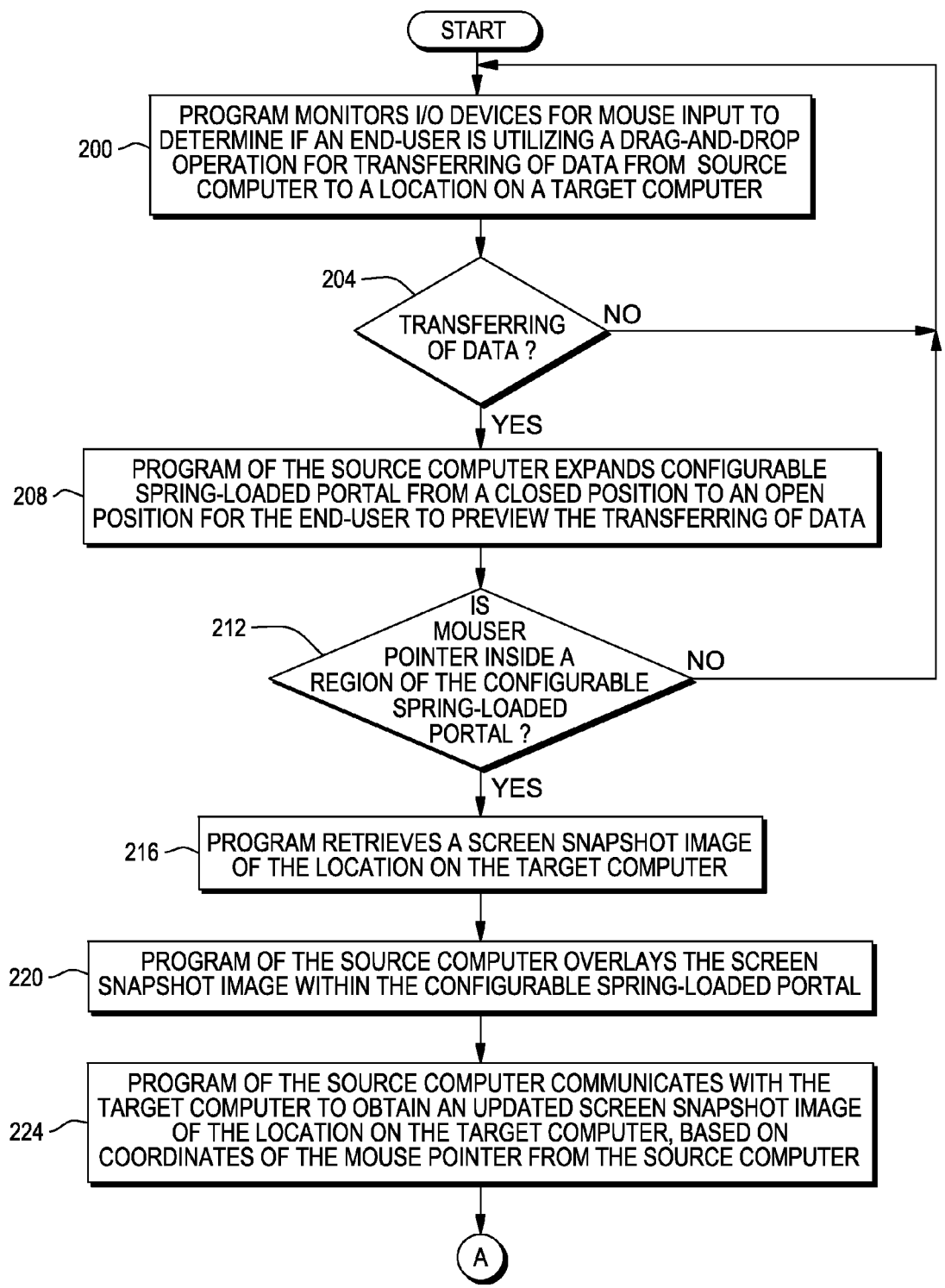
FIGS. 2A and 2B are flowcharts of the data sharing software program having a drag-and-drop operation that enables a transferring of data from a source computer to a location on a target computer, wherein the location on the target computer is previewable at the source computer through a configurable spring-loaded portal according to an embodiment of the present invention.
Figure 2B:
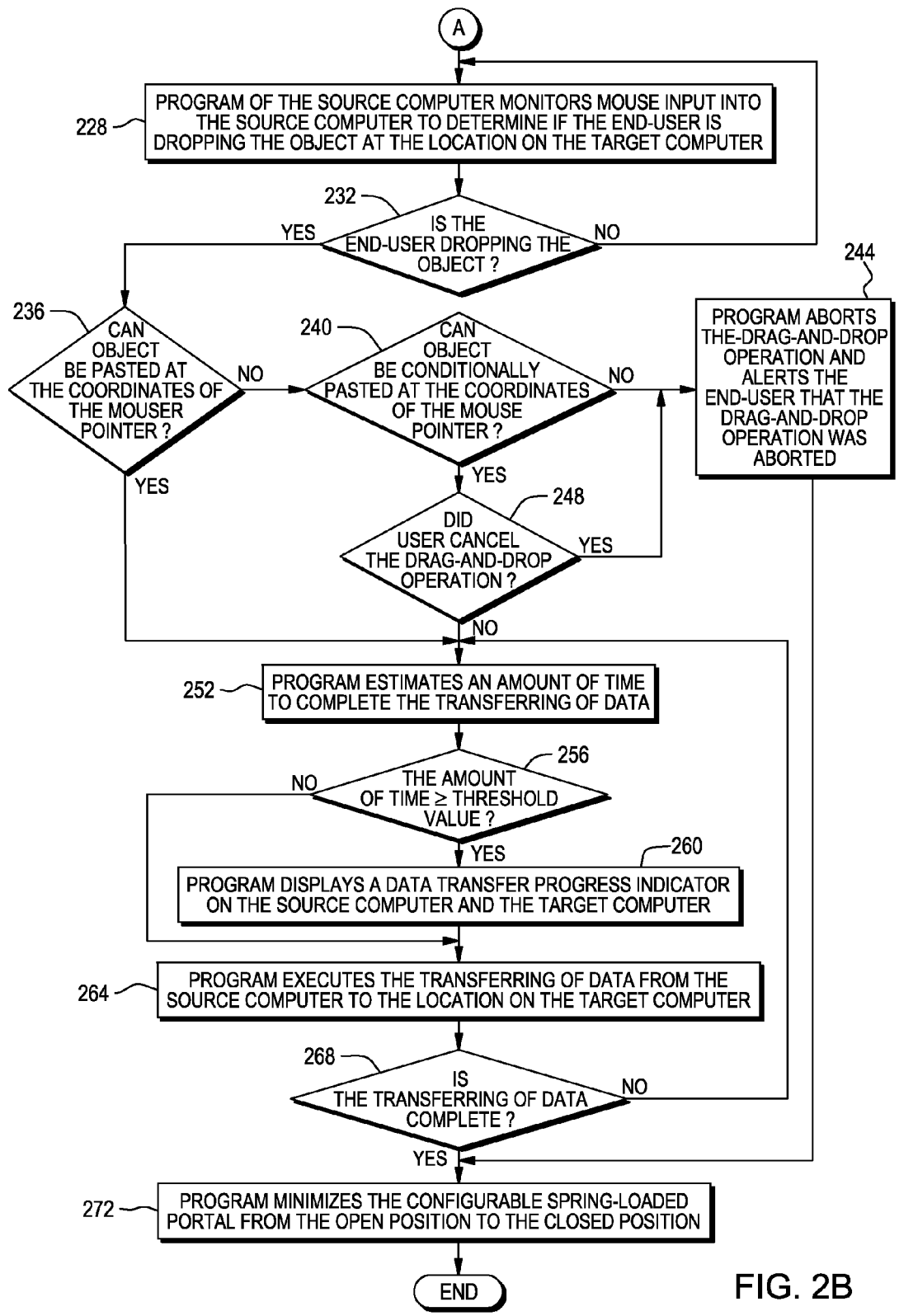

FIGS. 2A and 2B are flowcharts illustrating key steps of data sharing software program 30 that is installed on computers 10, wherein computers 10 can be a source computer and/or target computer. Program 30 determines if an end-user is utilizing a drag-and-drop operation of the program for transferring of data between computers 10, from a source computer to a location on a target computer (step 200). Specifically, to determine if the end-user is utilizing the drag-and-drop operation of program 30 the program monitors I/O devices 26 for mouse input that includes coordinates of a mouse pointer, clicks of the mouse pointer, and movement of the mouse pointer. Thus, the drag-and-drop operation can be invoked by the end-user based on how the end-user positions, clicks, and moves the mouse pointer.

As shown in FIG. 2A, if program 30 of the source computer does not receive mouse input indicating that an object (e.g., image, file object, or text object) is being dragged over configurable spring-loaded portal 312, the program will determine that the end-user is not currently utilizing the drag-and-drop operation for transferring of data (decision 204, no branch), but the program will continue to monitor I/O devices 26 for mouse input to determine if the end-user is utilizing the drag-and-drop operation. Otherwise, if program 30 of the source computer receives mouse input indicating that an object is being dragged over configurable spring-loaded portal 312, the program determines that the end-user is utilizing the drag-and-drop operation for transferring of data (decision 204, yes branch) from the source computer to the location on the target computer, and the program expands the configurable spring-loaded portal from a closed position to an open position (step 208). Thus, configurable spring-loaded portal 312 is a window that can expand from the closed position to the open position, which is triggered when the coordinates of the mouse pointer correspond to a region of the configurable spring-loaded portal. Moreover, the location on the target computer where the end-user is transferring data to is previewable through configurable spring-loaded portal 312 of the source computer, which allows the end-user to view the desktop of the target computer even while transferring of data is being performed.

While configurable spring-loaded portal 312 is in the open position, program 30 continues to monitor whether the coordinates of the mouse pointer are inside the region of the configurable spring-loaded portal. If the coordinates of the mouse pointer are not inside the region of configurable spring-loaded portal 312, then program 30 will minimize the configurable spring-loaded portal to a closed position, and will continue to monitor I/O devices 26 for mouse input to determine if the end-user is utilizing the drag-and-drop operation for transferring of data from the source computer to a location on a target computer (decision 212, no branch). Moreover, if the coordinates of the mouse pointer are inside the region of configurable spring-loaded portal 312 (decision 212, yes branch), then program 30 retrieves a screen snapshot image of the location on the target computer (step 216). Subsequently, program 30 of the source computer overlays the screen snapshot image within configurable spring-loaded portal 312 that is on a display coupled to the source computer (step 220). After performing the overlay of the screen snapshot image, program 30 of the source computer continues to communicate with the target computer to obtain an updated screen snapshot image of the location on the target computer, based on the coordinates of the mouse pointer from the source computer (step 224). The updated screen snapshot image is utilized to refresh the configurable spring-loaded portal 312.

In addition, program 30 of the source computer monitors mouse input into the source computer to determine if the end-user is dropping the object at the location on the target computer (step 228). If program 30 determines that the end-user is not yet dropping the object, then the program continues to monitor mouse input into the source computer to determine if the end-user is dropping the object at the location on the target computer (decision 232, no branch). Otherwise, if program 30 determines that the end-user is dropping the object (decision 232, yes branch), then the program determines if the object can be pasted at the coordinates of the mouse pointer of the source computer at the location on the target computer. Program 30 can provide a visual indicator to guide the end-user to locations, on the target computer, that accept the transferring of the object (i.e., data). The visual indicator may include, but is not limited to, changing the appearance of the mouse pointer of the source computer while the mouse pointer is over a location on the target computer that does not accept the transferring of the object (i.e., data).

If the program 30 determines that the object cannot be pasted at the coordinates of the mouse pointer (decision 236, no branch), then the program will determine if the object can be conditionally pasted at the coordinates of the mouse pointer at the location on the target computer. If program 30 determines that the object cannot be conditionally pasted (decision 240, no branch), then the program aborts the drag-and-drop operation and alerts the end-user that the drag-and-drop operation was aborted (step 244). Alternatively, if program 30 determines that the object can be conditionally pasted at the coordinates of the mouse pointer (decision 240, yes branch) at the location on the target computer and that the end-user canceled the drag-and-drop operation (decision 248, yes branch), then the program aborts the drag-and-drop operation and alerts the end-user that the drag-and-drop operation was aborted (step 244). After the drag-and-drop operation is aborted, program 30 minimizes configurable spring-loaded portal 312 (step 272) and the program ends.

However, if program 30 determines that the end-user did not cancel the drag-and-drop operation (decision 248, no branch) or that the object can be pasted at the coordinates of the mouse pointer (decision 236, yes branch) at the location on the target computer, then the program estimates an amount of time to complete the transferring of data (step 252).

After performing the estimate, if program 30 determines that the amount of time is greater than or equal to a configurable threshold value (decision 256, yes branch), then the program will display a data transfer progress indicator on the source computer and the target computer (step 260). In addition, while the transferring of data is taking place, configurable spring-loaded portal 312 on the target computer that corresponds to the source computer will appear in a closed position on the display coupled to the target computer, the spring-loaded portal will flash to indicate the transferring of data is occurring, and the spring-loaded portal will stop flashing once the transferring of data is compete. Subsequently, program 30 executes the transferring of data from the source computer to the location on the target computer (step 264).

However, if after performing the estimate (step 252) program 30 determines that the amount of time is less than the configurable threshold value (decision 256, no branch), then the program will not display the data transfer progress indicator and will simply execute the transferring of data from the source computer to the location on the target computer (step 264). Subsequently, program 30 will determine if the transfer of data is complete. If the transferring of data is not complete (decision 268, no branch), then program 30 will again estimate an amount of time to perform the transferring of data (step 252). Otherwise, if the transferring of data is complete (decision 268, yes branch), then program 30 minimizes configurable spring-loaded portal 312 (step 272) from the open position to the closed position and the program ends.

FIGS. 3A-3H illustrate an end-user of source computer 320 utilizing data sharing program 30 to perform a drag-and-drop operation for transferring of data (e.g. a text object) from the source computer to a location on target computer 321, wherein the location on the target computer is previewable at the source computer through configurable spring-loaded portal 312. Source computer 320 and target computer 321 each have their own display, and each include their own configurable spring-loaded portal 312. In one embodiment, source computer 320 and/or target computer 321 may each only have one configurable spring-loaded portal 312, but in alternative embodiments the source computer and/or the target computer may each have more than one configurable spring-loaded portal.

Figure 3A:
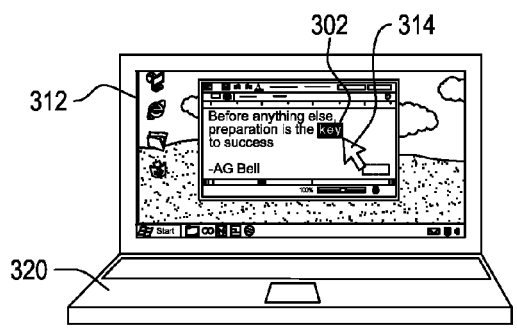
FIGS. 3A-3H are pictorial representations that illustrate an end-user utilizing the data sharing software program to perform a drag-and-drop operation to transfer data from a source computer to a location on a target computer, wherein the location on the target computer is previewable at the source computer through a configurable spring-loaded portal according to an embodiment of the present invention.

In FIG. 3A, while configurable spring-loaded portal 312 is in a closed position on source computer 320, the end-user selects text object 302 utilizing mouse pointer 314 of the source computer.

Figure 3B:
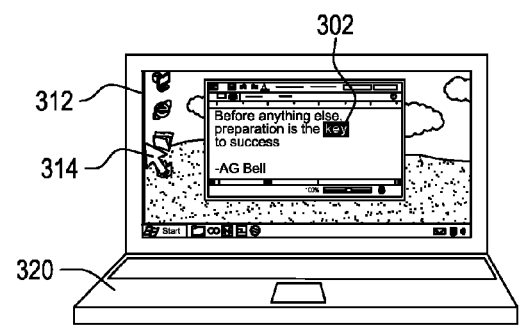

In FIG. 3B the end-user drags text object 302 over configurable spring-loaded portal 312 on source computer 320 utilizing mouse pointer 314, wherein the configurable spring-loaded portal is in the closed position. However, the action by the end-user of dragging text object 302 over configurable spring-loaded portal 312 triggers program 30 to expand the configurable spring-loaded portal from the closed position to the open position.

Figure 3C:
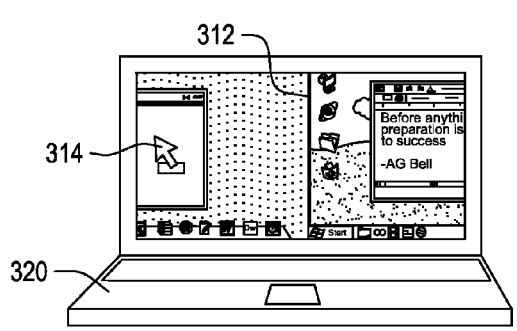

Thus, in FIG. 3C program 30 expands configurable spring-loaded portal 312 of source computer 320 from the closed position to the open position, wherein the transferring of text object 302 is previewable through the configurable spring-loaded portal by the end-user. Specifically, configurable spring-loaded portal 312 of source computer 320 can expand from the closed position to the open position while the end-user is dragging text object 302 with mouse pointer 314 and coordinates of the mouse pointer are within a region occupied by the configurable spring-loaded portal.

Figure 3D:
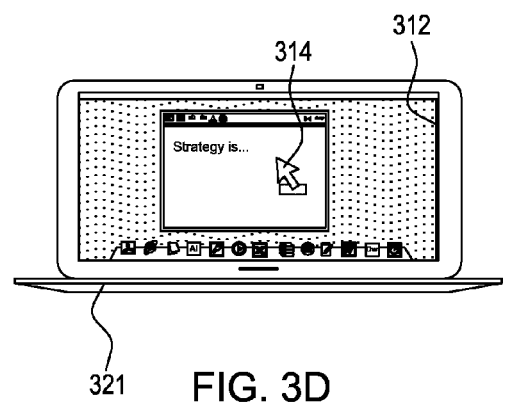

FIG. 3D illustrates the appearance of mouse pointer 314 on the display of target computer 321 during the transferring of text object 302 from source computer 320 to the location on target computer 321. Specifically, on the display of target computer 321, mouse pointer 314 is highlighted and configurable spring-loaded portal 312 of the target computer can flash to indicate the transferring of text object 302 from source computer 320 to the target computer.

Figure 3E:
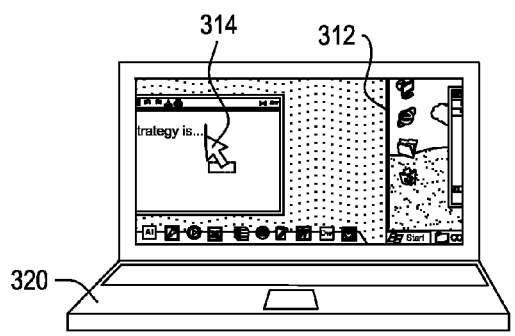

FIG. 3E illustrates that the location of mouse pointer 314 is controlled from source computer 320. In addition, while text object 302 is being dragged by the end-user over configurable spring-loaded portal 312 of source computer 320, program 30 continues to refresh the configurable spring-loaded portal with an updated screen snapshot image of the location on target computer 321.

Figure 3F:
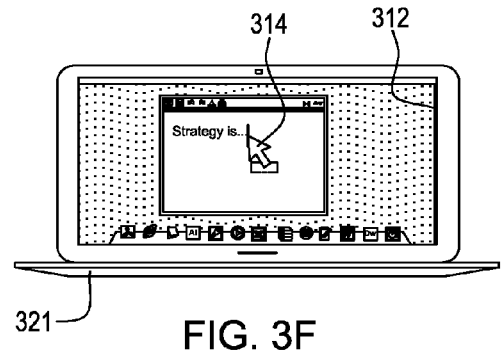

FIG. 3F illustrates the end-user dropping text object 302 at the location on target computer 321. Specifically, mouse pointer 314 of source computer 320 is highlighted and viewable on the display coupled to target computer 321. After dropping text object 302 at the location on target computer 321 and the transferring of the text object is complete, configurable spring-loaded portal 312 of source computer 320 will return to the closed position.

Figure 3G:
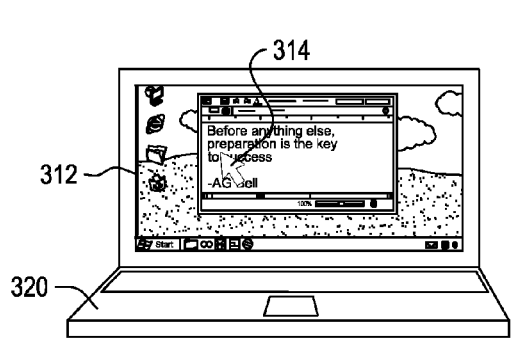

FIG. 3G illustrates configurable spring-loaded portal 312 of source computer 320 in the closed position after utilizing mouse pointer 314 to drop text object 302 at the location on target computer 321.

Figure 3H:
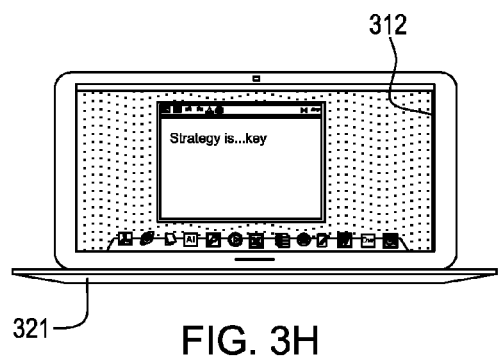

FIG. 3H, illustrates that mouse pointer 314 of source computer 320 no longer appears on target computer 321 after the transferring of text object 302 is complete.

Based on the foregoing, a computer system, method, and program product for providing an efficient and intuitive way to transfer data from a source computer to a location on a target computer utilizing a drag-and-drop operation and a spring-loaded portal have been disclosed, wherein the location on the target computer is previewable at the source computer through the spring-loaded portal while the transfer of data is being performed. However, numerous modifications and substitutions can be made without deviating from the scope of the present invention. In this regard, each block in the flowchart or block diagrams may represent a module, segment, or portion of code, which includes one or more executable instructions for implementing the specified logical functions(s). It should be noted that, in some alternative implementations, the functions noted in the block may occur out of the order noted in the figures. Therefore, the present invention has been disclosed by way of example and not limitation.

What is claimed is:

1. A method for transferring of data from a source computer to a location on a target computer utilizing a drag-and-drop operation and a spring-loaded portal, the method comprising the steps of:

the source computer monitoring I/O devices for mouse input, wherein the mouse input comprises coordinates of a mouse pointer;

the source computer determining if an end-user is utilizing the mouse pointer to perform the drag-and-drop operation by detecting when an object has been dragged over the spring-loaded portal, the spring-loaded portal representing a location on the target computer to which the object will be transferred if such a transfer is allowed;

the source computer expanding the spring-loaded portal from a closed position to an open position, the spring-loaded portal being configured for the transferring of data using the drag-and-drop operation;

the source computer retrieving a screen snapshot image of the location on the target computer and overlaying the screen snapshot image on the spring-loaded portal;

the source computer executing the transferring of data from the source computer to the location on the target computer, wherein the location on the target computer is previewable at the source computer through the spring-loaded portal while the transferring of data is performed by the end-user;

the source computer determining whether to abort the transferring of data from the source computer to the location on the target computer without user input, when an object is dropped onto a set of coordinates within a region that corresponds to the spring-loaded portal, wherein the set of coordinates are indicated by the mouse pointer, the transferring of data being initiated when the object is dropped onto the set of coordinates; and the source computer minimizing the spring-loaded portal from the open position to the closed position.

2. The method 1, wherein:

the spring-loaded portal is configurable to allow the spring-loaded portal to flash to indicate the transferring, and to be sized and assigned a label based on preference of the end-user; and the label can include color or text, or a combination thereof.

3. The method 1, wherein:

the step of determining if the end-user is utilizing the mouse pointer to perform the drag-and-drop operation further comprises the source computer determining if the coordinates of the mouse pointer correspond to a region of the spring-loaded portal; and the source computer expanding the spring-loaded portal from the closed position to the open position is triggered if the coordinates of the mouse pointer correspond to the region of the spring-loaded portal.

4. The method of claim 3, wherein the source computer determining if the coordinates of the mouse pointer correspond to coordinates inside the region of the spring-loaded portal further comprises the source computer retrieving the coordinates of the mouse pointer and a mouse drag-and-drop action from the mouse input, and comparing the coordinates of the mouse pointer to coordinates of the region of the spring-loaded portal.

5. The method of claim 1, wherein the step of retrieving the screen snapshot image of the location on the target computer further comprises refreshing the spring-loaded portal with an updated screen snapshot image.

6. The method of claim 1, wherein the step of executing the transferring of data from the source computer to the location on the target computer is triggered when the end-user drops an object at the location on the target computer, utilizing the mouse pointer to perform the drag-and-drop operation;

the step of executing the transferring of data from the source computer to the location on the target computer further comprises the source computer and the target computer sending and receiving information on whether the target computer accepts the transferring of data at the location on the target computer;

a visual indicator to guide the end-user to locations, on the target computer, that accept the transferring of data; and the visual indicator includes changing the appearance of the mouse pointer while the mouse pointer is over a location on the target computer that does not accept the transferring of data.

7. The method of claim 1, wherein the step of aborting the transferring of data from the source computer to the location on the target computer is triggered when the end-user cancels the drag-and-drop operation, or an object cannot be dropped at the location on the target computer.

8. The method of claim 1, wherein the step of minimizing the spring-loaded portal from the open position to the closed position is triggered if the coordinates of the mouse pointer do not correspond to a region of the spring-loaded portal.

9. A computer program product for transferring of data from a source computer to a location on a target computer utilizing a drag-and-drop operation and a spring-loaded portal, the computer program product comprising:
a computer-readable-hardware storage device and program instructions stored on the computer-readable hardware storage device, the program instructions comprising:
program instructions to monitor I/O devices for mouse input, wherein the mouse input comprises coordinates of a mouse pointer;
program instructions to determine if an end-user is utilizing the mouse pointer to perform the drag-and-drop operation by detecting when an object has been dragged over the spring-loaded portal, the spring-loaded portal representing a location on the target computer to which the object will be transferred if such a transfer is allowed;
program instructions to expand the spring-loaded portal from a closed position to an open position, the spring-loaded portal being configured for the transferring of data using the drag-and-drop operation;
program instructions to retrieve a screen snapshot image of the location on the target computer and overlay the screen snapshot image on the spring-loaded portal;
program instructions to execute the transferring of data from the source computer to the location on the target computer, wherein the location on the target computer is previewable at the source computer through the spring-loaded portal;
program instructions to determine whether to abort the transferring of data from the source computer to the location on the target computer, without user input, when an object is dropped onto a set of coordinates within a region that corresponds to the spring-loaded portal, wherein the set of coordinates are indicated by the mouse pointer, the transferring of data being initiated when the object is dropped onto the set of coordinates; and
program instructions to minimize the spring-loaded portal from the open position to the closed position.

10. The computer program product of claim 9, wherein:
the spring-loaded portal is configurable to allow the spring-loaded portal to flash to indicate the transferring, and to be sized and assigned a label based on preference of the end-user; and
the label can include color or text, or a combination thereof.

11. The computer program product of claim 9, wherein:
the program instructions to determine if the end-user is utilizing the mouse pointer to perform the drag-and-drop operation further comprises program instructions to determine if the coordinates of the mouse pointer correspond to a region of the spring-loaded portal; and
the program instructions to expand the spring-loaded portal from the closed position to the open position are triggered if the coordinates of the mouse pointer correspond to the region of the spring-loaded portal.

12. The computer program product of claim 11, wherein the program instructions to determine if the coordinates of the mouse pointer correspond to the region of the spring-loaded portal further comprises program instructions to retrieve the coordinates of the mouse pointer and a mouse drag-and-drop action from the mouse input, and compare the coordinates of the mouse pointer with coordinates of the spring-loaded portal.

13. The computer program product of claim 9, wherein the program instructions to retrieve the screen snapshot image of the location on the target computer further comprises program instructions to refresh the spring-loaded portal with an updated screen snapshot image.

14. The computer program product of claim 9, wherein the program instructions to execute the transferring of data from the source computer to the location on the target computer are triggered when the end-user drops an object at the location on the target computer, utilizing the mouse pointer to perform the drag-and-drop operation;
the program instructions to execute the transferring of data from the source computer to the location on the target computer further comprises program instructions to send and receive information on whether the target computer accepts the transferring of data at the location on the target computer;
a visual indicator to guide the end-user to locations, on the target computer, that accept the transferring of data; and
the visual indicator includes changing the appearance of the mouse pointer while the mouse pointer is over a location on the target computer that does not accept the transferring of data.

15. The computer program product of claim 9, wherein the program instructions to determine whether to abort the transferring of data from the source computer to the location on the target computer are triggered when the end-user cancels the drag-and-drop operation, or an object cannot be dropped at the location on the target computer.

16. The computer program product of claim 9, wherein the program instructions to minimize the spring-loaded portal from the open position to the closed position are triggered if the coordinates of the mouse pointer do not correspond to a region of the spring-loaded portal.

17. A computer system for transferring of data from a source computer to a location on a target computer utilizing a drag-and-drop operation and a spring-loaded portal, the computer system comprising:
one or more processors, one or more computer-readable memories, one or more computer-readable hardware storage devices, and program instructions stored on the one or more computer-readable hardware storage devices for execution by the one or more processors via the one or more memories, the program instructions comprising:
program instructions to monitor I/O devices for mouse input, wherein the mouse input comprises coordinates of a mouse pointer;
program instructions to determine if an end-user is utilizing the mouse pointer to perform the drag-and-drop operation by detecting when an object has been dragged over the spring-loaded portal, the spring-loaded portal representing a location on the target computer to which the object will be transferred if such a transfer is allowed;
program instructions to expand the spring-loaded portal from a closed position to an open position, the spring-loaded portal being configured for the transferring of data using the drag-and-drop operation;
program instructions to retrieve a screen snapshot image of the location on the target computer and overlay the screen snapshot image on the spring-loaded portal;
program instructions to execute the transferring of data from the source computer to the location on the target computer, wherein the location on the target computer is previewable at the source computer through the spring-loaded portal;
program instructions to determine whether to abort the transferring of data from the source computer to the location on the target computer, without user input, when an object is dropped onto a set of coordinates within a region that corresponds to the spring-loaded portal, wherein the set of coordinates are indicated by the mouse pointer, the transferring of data being initiated when the object is dropped onto the set of coordinates; and program instructions to minimize the spring-loaded portal from the open position to the closed position.

18. The computer system of claim 17, wherein:
the spring-loaded portal is configurable to allow the spring-loaded portal to flash to indicate the transferring, and to be sized and assigned a label based on preference of the end-user; and
the label can include color or text, or a combination thereof.

19. The computer system of claim 17, wherein:
the program instructions to determine if the end-user is utilizing the mouse pointer to perform the drag-and-drop operation further comprises program instructions to determine if the coordinates of the mouse pointer correspond to a region of the spring-loaded portal; and
the program instructions to expand the spring-loaded portal from the closed position to the open position are triggered if the coordinates of the mouse pointer correspond to the region of the spring-loaded portal.

20. The computer system of claim 19, wherein the program instructions to determine if the coordinates of the mouse pointer correspond to the region of the spring-loaded portal further comprises program instructions to retrieve the coordinates of the mouse pointer and a mouse drag-and-drop action from the mouse input, and compare the coordinates of the mouse pointer with coordinates of the spring-loaded portal.

21. The computer system of claim 17, wherein the program instructions to retrieve the screen snapshot image of the location on the target computer further comprises program instructions to refresh the spring-loaded portal with an updated screen snapshot image.

22. The computer system of claim 17, wherein the program instructions to execute the transferring of data from the source computer to the location on the target computer are triggered when the end-user drops an object at the location on the target computer, utilizing the mouse pointer to perform the drag-and-drop operation;
the program instructions to execute the transferring of data from the source computer to the location on the target computer further comprises program instructions to send and receive information on whether the target computer accepts the transferring of data at the location on the target computer;
a visual indicator to guide the end-user to locations, on the target computer, that accept the transferring of data; and
the visual indicator includes changing the appearance of the mouse pointer while the mouse pointer is over a location on the target computer that does not accept the transferring of data.

23. The computer system of claim 17, wherein:
the program instructions to determine whether to abort the transferring of data from the source computer to the location on the target computer are triggered when the end-user cancels the drag-and-drop operation, or an object cannot be dropped at the location on the target computer.

24. The computer system of claim 17, wherein the program instructions to minimize the spring-loaded portal from the open position to the closed position are triggered if the coordinates of the mouse pointer do not correspond to a region of the spring-loaded portal.

* * * * *